United States Patent [19]

Motoyama

[11] Patent Number: 5,550,614
[45] Date of Patent: Aug. 27, 1996

[54] METHOD AND SYSTEM FOR DETECTING AND DISTINGUISHING BETWEEN BLANK PAGES WITHIN A REPRODUCTION JOB

[75] Inventor: Tetsuro Motoyama, Cupertino, Calif.

[73] Assignees: Ricoh Company, Ltd., Tokyo, Japan; Ricoh Corporation, San Jose, Calif.

[21] Appl. No.: 463,001

[22] Filed: Jun. 5, 1995

[51] Int. Cl.⁶ .................................................. G03G 21/00
[52] U.S. Cl. .......................... 355/206; 355/208; 355/308; 358/296
[58] Field of Search ...................................... 355/200, 202, 355/203, 204, 205, 206, 207, 208, 209, 308, 309, 77; 271/3.14, 3.15, 3.17, 8.1; 358/296, 300, 443, 448

[56] References Cited

U.S. PATENT DOCUMENTS

| | | | |
|---|---|---|---|
| 4,763,161 | 8/1988 | Forest et al. | 355/207 |
| 5,107,338 | 4/1992 | Saito | 358/296 |
| 5,179,410 | 1/1993 | Farrell et al. | 355/207 |
| 5,237,380 | 8/1993 | Iimori | 355/208 X |
| 5,311,254 | 5/1994 | Watanabe | 355/206 |
| 5,333,043 | 7/1994 | Yamada | 355/309 |
| 5,339,139 | 8/1994 | Fullerton et al. | 355/308 X |

*Primary Examiner*—Sandra L. Brase
*Attorney, Agent, or Firm*—Oblon, Spivak, McClelland, Maier, & Neustadt, P.C.

[57] ABSTRACT

A system for analyzing pages has a circuit for generating page information, a circuit for determining if the page information represents a blank page, a blank page counter that is incremented if a blank page is detected, a comparator for comparing the blank page counter to a blank page threshold memory, and an error indicating circuit that indicates an error signal if the blank page counter exceeds the blank page threshold and a detect signal is active. The page analysis system detects blank pages within a job and distinguishes between initial blank pages caused by incorrectly oriented original pages within a machine, and intentionally blank pages within the middle of a job.

21 Claims, 7 Drawing Sheets

METHOD AND SYSTEM FOR DETECTING AND DISTINGUISHING BETWEEN BLANK PAGES WITHIN A REPRODUCTION JOB

FIELD OF THE INVENTION

The present invention relates generally to a reproduction machine and more particularly to a system and method for selectively detecting and distinguishing between initial blank pages within a reproduction job and subsequent blank pages within a reproduction job.

BACKGROUND OF THE INVENTION

A copy machine was originally an analog system in which a page to be copied is illuminated by a light source to generate a latent image on a photosensitive drum. Toner is then applied to the drum and the toner is attracted and adheres to the latent image. A piece of blank copy paper is run past the photosensitive drum so that the latent image on the drum transfers to the copy paper. The image on the paper is then permanently fused on to the paper by a high temperature fuser. This type of copy machine is an analog machine because no digital image of the page is ever created.

With the advances of computers and scanners, a digital copier was introduced that scanned a page using a CCD into memory in digital format so that the page could be altered and reprinted more easily. A digital copier also made it much easier to create multiple sets of the same documents when the document is stored in memory. Recently, companies have begun to incorporate other features into these digital copiers. For example, a facsimile machine can be incorporated into a digital copier. In addition, if the digital copier is connected to a computer network, then the digital copier can also serve as a printer. All of these functions use the same scanning, control and printer units that are contained within the digital copier.

All of these machines, also known as reproduction machines, have an automatic document feeder that can be used to feed the reproduction jobs into the machine. In addition, for a multi-function digital machine, facsimile jobs can also be fed into the machine using the automatic document feeder.

Analog and digital reproduction machines and digital multi-function reproduction machines all have a problem that has never been fully resolved. Generally, a reproduction machine cannot sense that the user has incorrectly placed papers in the automatic document feeder. Typically, a reproduction machine has an automatic document feeder that either requires face-up original documents or face-down original documents. If a user places original documents face-up on a face-down automatic document feeder, then a reproduction machine will make blank copies that are of no use to the user.

There are several systems for sensing blank pages within a reproduction job and stopping the reproduction process. These systems stop a reproduction job whenever a blank page is detected. However, sometimes a user may intentionally place blank pages within a reproduction job in order to separate sections of a document. Any conventional blank page detection system can not differentiate between intentionally placed blank pages and blank pages caused by a reproduction job incorrectly placed on the automatic document feeder. In addition, many of these systems require that a separate sensor is used to generate the necessary data to determine if a blank page exists.

OBJECTS AND SUMMARY OF THE INVENTION

It is therefore an object of the present invention to provide a blank page distinguishing and detection system and method that can detect an incorrectly placed reproduction job in an automatic document feeder (multiple initial blank pages in a reproduction job) and abort it, but that can also permit a blank page within the middle of a reproduction job to print normally.

It is another object of the present invention to provide a blank page distinguishing and detection system and method that uses the digital signals available in a digital reproduction machine to detect improper and proper blank pages within a reproduction job.

It is another object of the present invention to provide a blank page distinguishing and detection system and method for an analog copier that has a sensor located in the automatic document feeder to generate the digital signals used to detect and distinguish blank pages within a reproduction job.

These and other objects of the present invention are provided by a reproduction apparatus having a scanning unit, a control unit, a plotting unit and a detecting unit for distinguishing and detecting between initial blank pages in a reproduction job and subsequent blank pages. The detection unit is located within either the scanning unit or the plotting unit.

The detection unit has a blank page control unit, an image processing unit connected to the blank page control unit, a blank page counter located in the image processing unit, and a blank page comparison unit connected to the blank page counter and connected to the blank page control unit. The detection unit may also have a user-adjustable blank page threshold register.

A method for distinguishing between initial blank pages and subsequent blank pages within a job for a reproduction machine has the steps of selectively generating a detect signal, scanning a page to generate digital page data, and comparing the digital page data to a black spot threshold. Then a blank page counter is incremented if the black spot threshold is not exceeded, and the blank page counter is compared to a blank page threshold. Finally, if the blank page counter exceeds the blank page threshold and the detect signal is active, then the reproduction machine job is stopped.

These and other objects of the present invention will become more readily apparent when taken in conjunction with the following drawings.

DETAILED DESCRIPTION OF THE INVENTION

Figure 1:
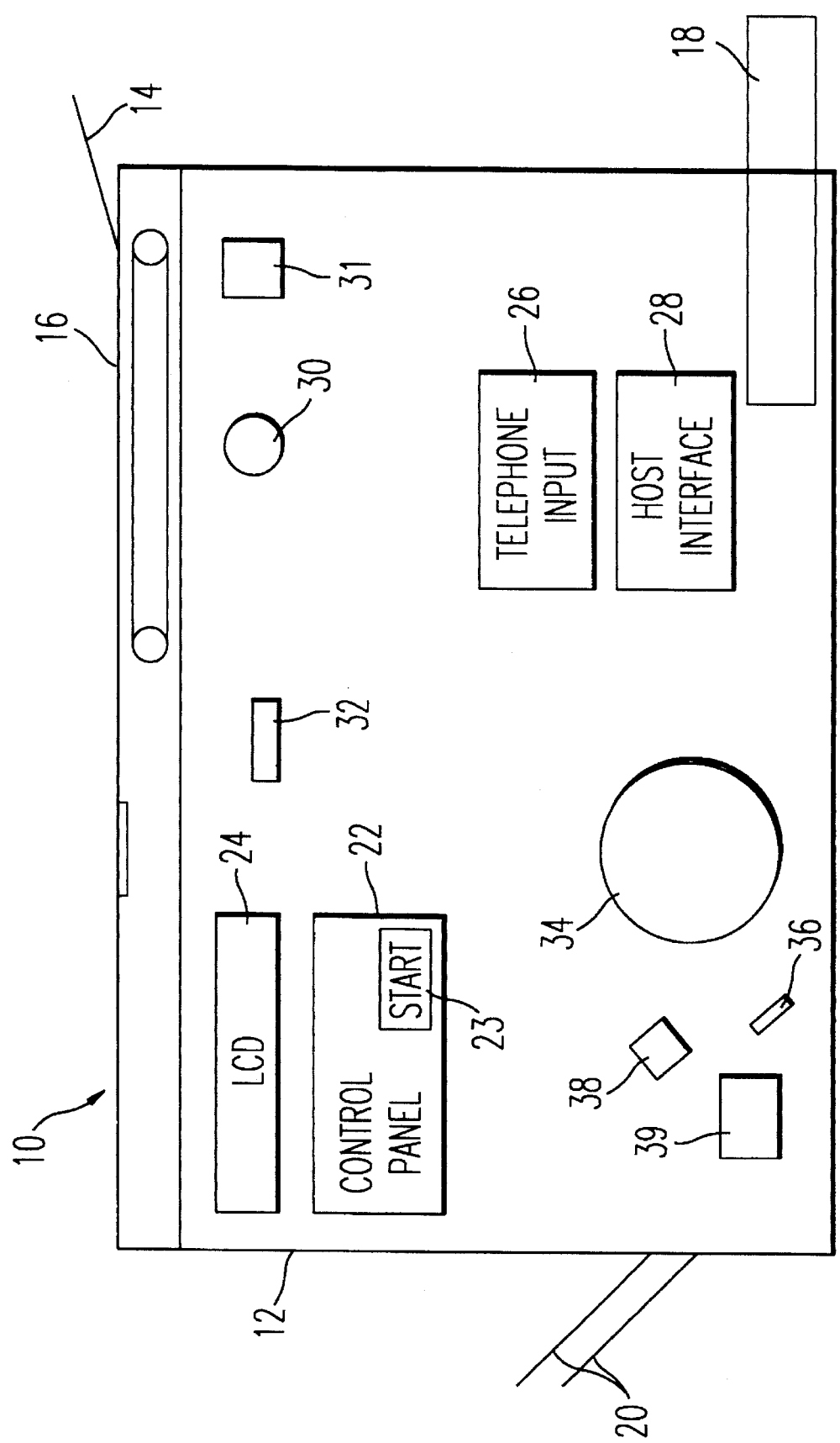
FIG. 1 is a schematic view of a digital copier showing the basic components of a digital copier.

FIG. 1 is a schematic view of a digital copier showing the basic components of a digital copier. The digital copier shown is a multi-function reproduction machine 10 that can perform multiple functions such as copying, printing and faxing. The present invention, however, works equally well for a digital copier. For clarity, a multi-function reproduction machine 10 will be described below. The multi-function machine 10 includes a housing 12. To feed documents into the multi-function machine 10, a document feeder 14 and an automatic document transport 16 are provided. The document feed 14 holds the documents to be scanned in and printed. The automatic document transport 16 transports documents past the scanning apparatus in the multi-function machine 10. A paper tray 18 provides paper for copying images on to. A pair of output bins 20 provides an output for the printer or copier jobs.

The multi-function machine 10 which is also known as a reproduction machine, is controlled by a control panel 22 having a START button 23. In order to allow interaction with a user during a copy or reproduction job, a liquid crystal display 24 is provided. The combination of the control panel 22 and the liquid crystal display 24 allow a user to control the functioning of the machine. For example, a user presses the START button 23 when a new reproduction job is started. For a multi-function machine, these functions can include copying, printing or a facsimile transmission. In order to provide for the facsimile transmission function, a telephone input 26 may be provided. In order to provide for the printing function, a host interface 28 is provided that connects the multi-function machine 10 to a computer network. The multi-function machine 10 will operate like a printer when connected to a computer network. Both the telephone input 26 and the host interface 28 are not required for the present invention to function.

In order to image a document, the document is fed from the document feed 14 by the automatic document transport 16. A light source 30 directs light to a mirror assembly 31 that reflects the light and illuminates the document as it is transported by the automatic document transport 16. The image generated from the light hitting the document strikes a charge coupled device (CCD) 32. The CCD 32 generates an electronic representation of the optical characteristics of a document page. Then, once the image is ready for printing, a different system of the multi-function machine 10 will print the document.

In order to print a document, a photoreceptor 34, a laser 36, a polygon mirror 38, and a fuser 39 are provided. In operation, the laser 36 is controlled by the multi-function machine 10 to generate an appropriate image of the paper. The laser light is then bounced off a rotating polygon mirror 38 and forms a latent image on the photoreceptor 34. After toner is applied to the photoreceptor 34, a page from the paper tray 18 is fed past the photoreceptor 34 and the image on the photoreceptor 34 is transferred onto the paper. Finally, the image is fused to the paper by the fuser 39 and the paper with the fused image is output to the output bins 20.

Figure 2:
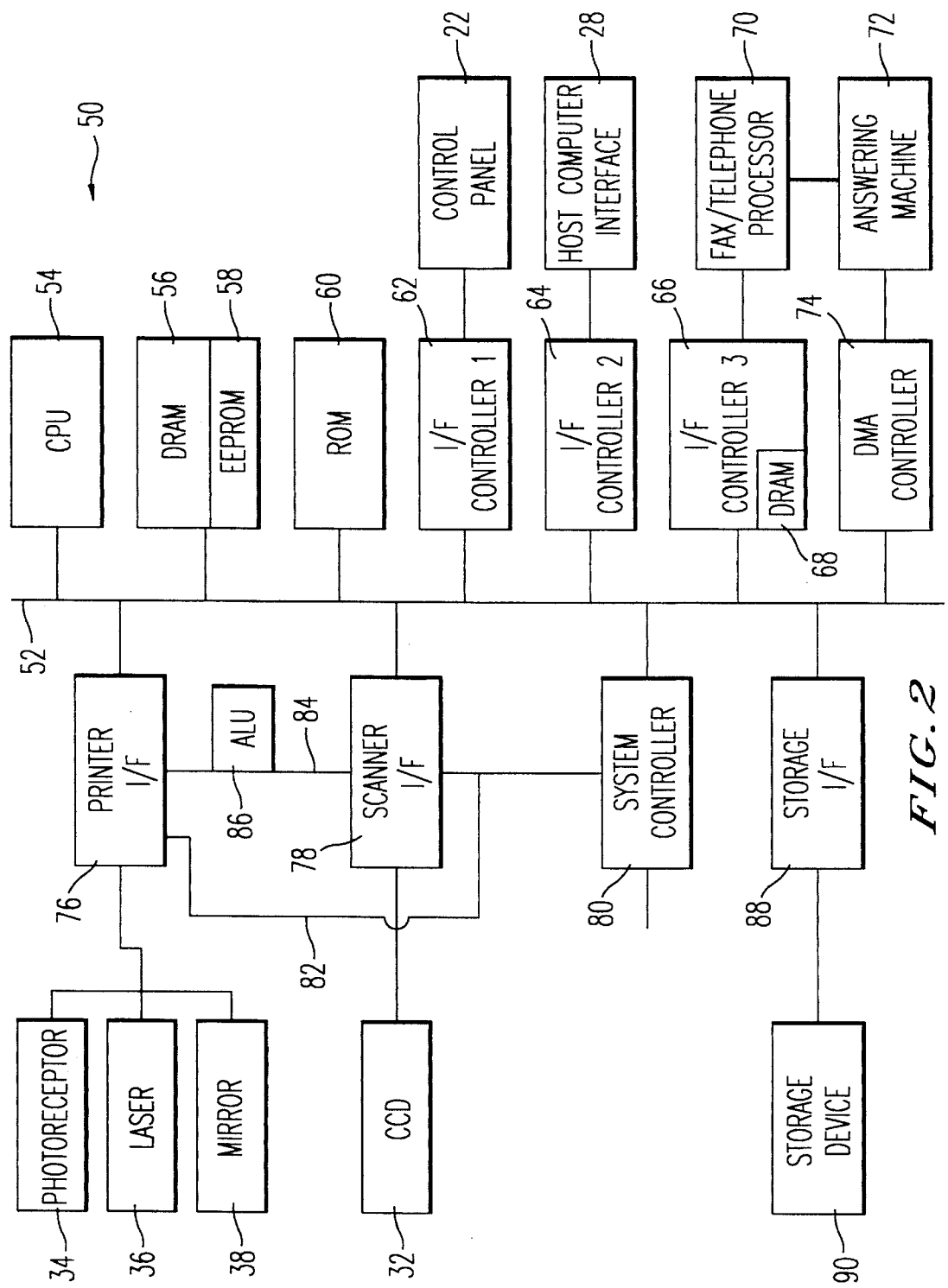
FIG. 2 is a schematic block diagram of the system bus and system blocks within a digital copier including a printer interface, a scanner interface, a host computer and a central processing unit (CPU)

To more fully understand the present invention, FIG. 2 shows a schematic block diagram of the system bus of the reproduction machine and the system blocks within the reproduction machine including electronic components 50. A system bus 52 connects all of the modules of the reproduction machine together. A central processing unit (CPU) 54 services multiple tasks while monitoring the state of the machine. A bank of dynamic random access memory (DRAM) 56 and a bank of electrically erasable programmable read only memory (EEPROM) 58 are preferably provided. A read only memory (ROM) module 60 stores initial values, default values and firmware. The firmware may include printing instructions to handle popular printing commands, such as PCL5 from Hewlett Packard or Postscript from Adobe Systems. A first interface controller 62 is coupled to the control panel 22 to permit the user to control the operations of the multi-function machine 10. A second interface controller 64 is preferably coupled to a host computer through the host interface 28. A document from a computer network to be printed on the multi-function machine 10 will enter the machine through the second interface controller 64.

A third interface controller 66 includes a DRAM 68 and is coupled to a fax/telephone processor 70. Preferably, the fax/telephone processor 70 has a module which distinguishes the incoming information as either voice or fax data, and automatically switches the system to the appropriate mode by notifying the CPU 54. The fax/telephone processor 70 is coupled to an answering machine 72 that answers an incoming facsimile or telephone call and routes it to the fax/telephone processor 70. For a multi-function machine that has a facsimile function the reproduction machine will also be connected to a telephone handset and a telephone line (not shown).

A direct memory access controller (DMA) 74 is also provided. The DMA 74 controls the access to the memory within the reproduction machine. A printer interface 76 is coupled to the system bus 52, and in addition is coupled to the printing elements of the reproduction machine such as the photoreceptor 34, laser 36, and rotating polygon mirror 38. The printer interface 76 controls the flow of information from the reproduction machine to the printing part of the machine to control the desired image. A scanner interface 78 is coupled to the CCD 32 so that scanned digital images can be obtained from the CCD 32. The scanner interface 78 is also connected to the system bus 52. A system controller 80 is connected to the scanner interface 78 and the printer interface 76 through system bus 52 and bus 82. The connection of the two buses allows the input-output related functions such as copying to occur simultaneously with other functions. For copying, a bus 84 provides an interface between the scanner interface 78 and printer interface 76 which enables the movement of image data directly between the two interface units.

An arithmetic logic unit (ALU) 86, is used to merge data from the scanner interface 78 with data from other sources "on the fly" as the scan data is being sent to the printer interface 76. In addition, merge data from the scanner can be directed to DRAM 56, either for temporary storage or for merging with other image data already stored in the DRAM 56.

A storage interface 88 is coupled to an external storage device 90, which may be hard disks, optical disks, and/or floppy disks. The storage device 90 may store sets of instructions to be used in accordance with the invention. In the alternative, these instructions may be stored in the ROM 60. The storage device 90, may also store digital images of a reproduction job after the job has been scanned in, but prior to printing.

Figure 3:
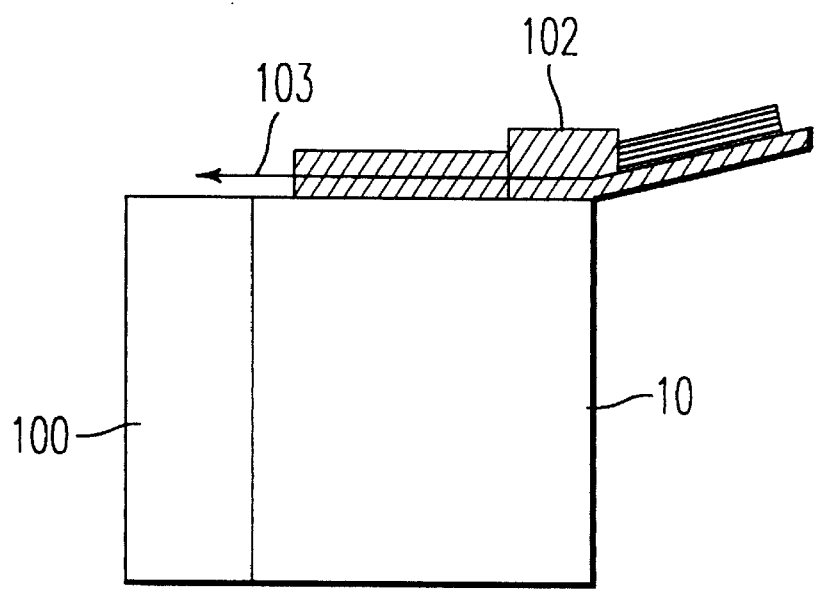
FIG. 3 is a schematic view of a face-down automatic document feeder.
Figure 4:
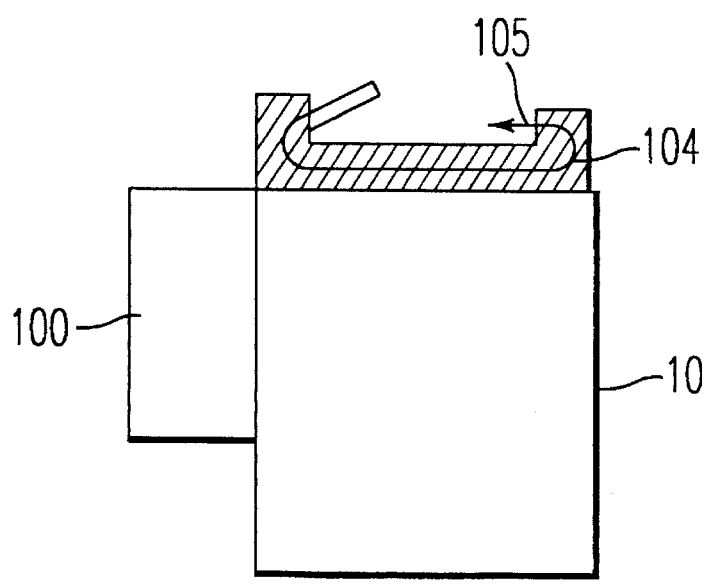
FIG. 4 is a schematic view of a face-up automatic document feeder.

FIGS. 3 and 4 show two types of automatic document feeders. FIG. 3 is a schematic view of a face down automatic document feeder. FIG. 4 is a schematic view of a face up automatic document feeder. The reproduction machines shown in FIGS. 3 and 4 are the same reproduction machines 10 that have different automatic document feeders. In addition, each of the machines 10 have a sorter 100. A face down automatic document feeder 102 is shown in FIG. 3. The face down document feeder 102 has a higher speed due to the straight paper path 103, but requires more space because it can not be contained on top of the reproduction machine 10. By contrast, a face up automatic feeder 104, is shown in FIG. 4, takes up much less room, but has a slower speed and a more complex paper path 105. The problem is that different reproduction machines may have either type of document feeder. This can cause a problem if a user places a document face up in a face down feeder since the reproduction machine will copy blank pages since the original pages are upside down. Similarly, face down documents in a face up feeder will also print a number of blank pages which are of no use to the user. In order to solve this problem, a system and method is needed to allow the copy machine to detect blank pages within a copy job. In addition, the system and method should be able to distinguish between an incorrectly placed job on an automatic document feeder and a blank page which may be intentionally left within a copy job in order to separate sections of the document.

For all of the embodiments of the present invention described below, the data obtained from scanning a page is transformed into a signal representing physical characteristics of the page which was scanned. Light from the light source is reflected off of the scanned page and detected by the CCD in order to transform optical characteristics of the page to electrical representations. The electrical representations are stored and further processed by the invention, as described below. In addition, the digital data representing the optical characteristics of a page can be generated by any conventional computer running a program, such as a word processing program, a database program, a spreadsheet program, an accounting program, a multimedia program or the like.

Figure 5:
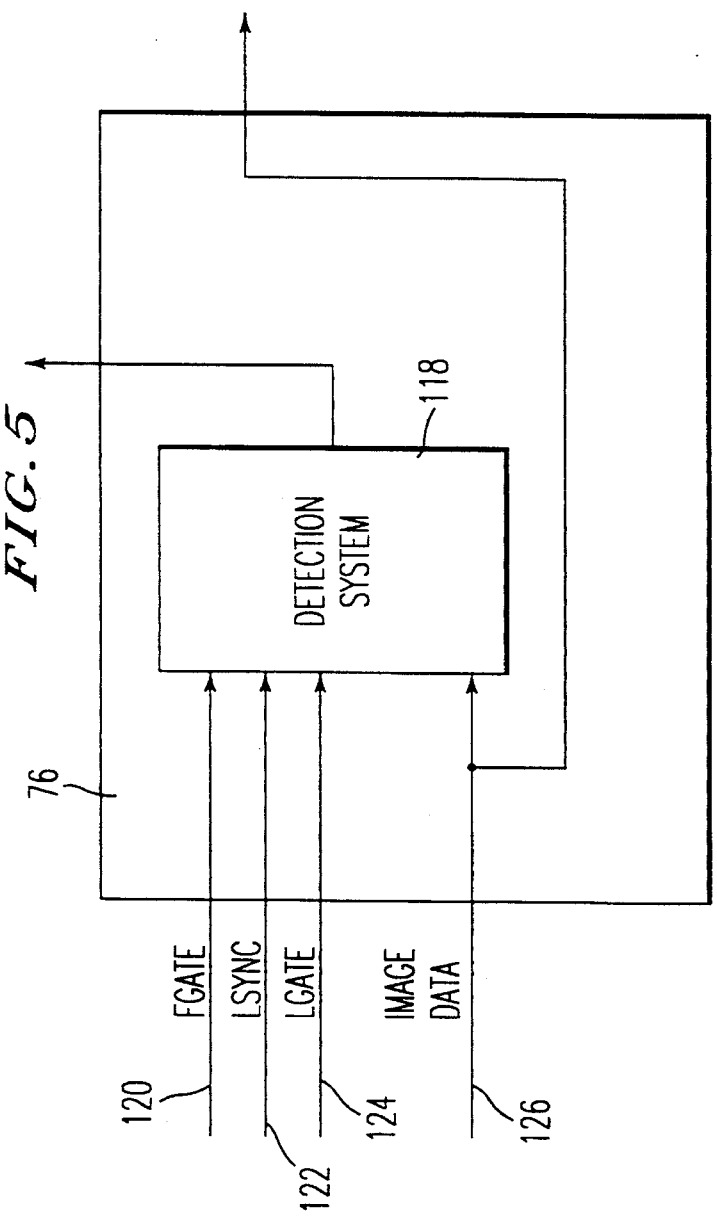
FIG. 5 is an embodiment of the blank page distinguishing and detection system and method of the present invention wherein the blank page distinguishing and detection system is located within the scanner interface or the plotter interface.

FIG. 5 is a schematic block diagram of an embodiment of a blank page detection system 118 of the present invention located in the printer interface 76. This embodiment is only illustrative since the blank page detection system 118 can also be located in the scanner interface (not shown). Whether the blank page detection system 118 is located within the printer interface 76 or the scanner interface, various control signals within the reproduction machine, such as an FGATE signal 120, an LSYNC signal 122 and an LGATE signal 124, are available to the detection system 118. Only the FGATE signal 120 is actually used to control the detection system 118. The LSYNC signal 122 and the LGATE signal 124 are shown merely for illustrative purposes. In addition, an IMAGEDATA signal 126 is fed into the detection system 118. The IMAGEDATA signal 126 contains electrical signals representing the optical characteristics of a page that are used by the detection system 118 to detect and distinguish blank pages in a reproduction job.

Figure 7:
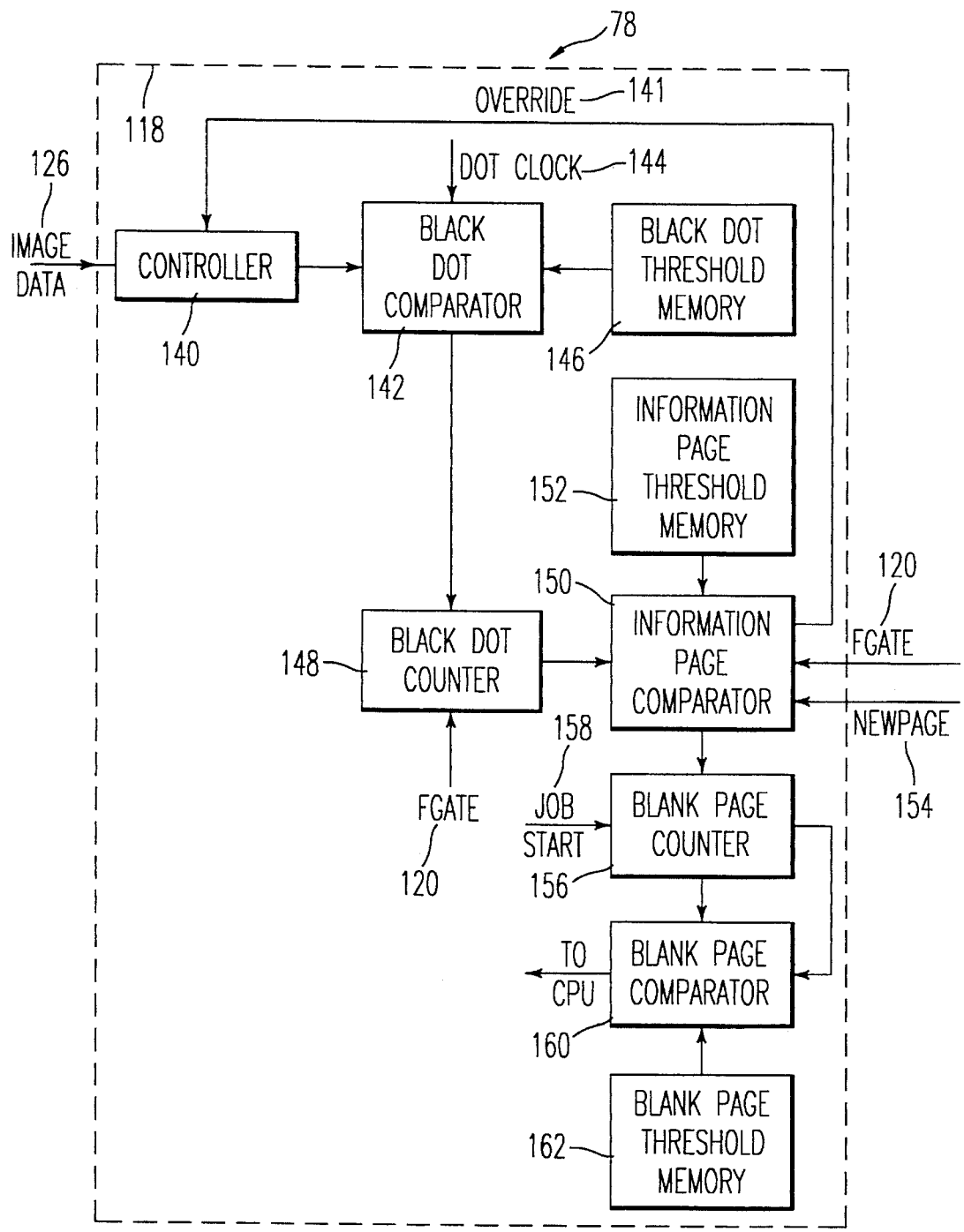
FIG. 7 is a more detailed block diagram of the detecting system of FIG. 5 showing the various hardware of the system and the electrical signals that control the blank page distinguishing and detection unit of the present invention.

Additional comparator and counter control signals are shown in FIG. 7, but not in FIG. 5. A person of ordinary skill in the art would understand that the comparator and counter control signals are shown to clarify the functioning of the hardware circuitry shown in FIG. 7.

Figure 6:
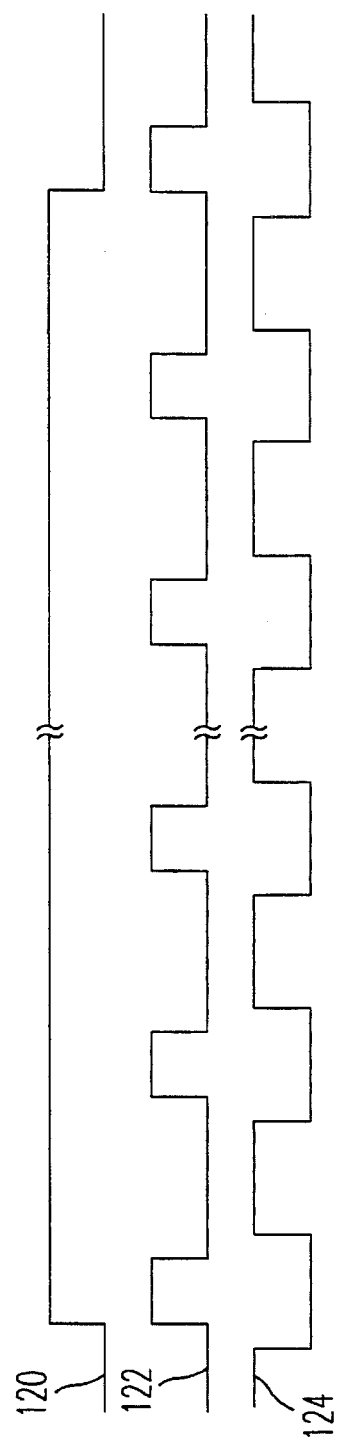
FIG. 6 is a timing diagram showing the electrical signals of FIG. 5.

FIG. 6 is a timing diagram showing the FGATE signal 120, the LSYNC signal 122 and the LGATE signal 124. The FGATE signal 120 changes from low to high (i.e., "0" to "1") at the beginning of a page and then changes back to a low signal (i.e., "0") at the end of a page. The LSYNC signal 122 pulses at the beginning of each new line of a page to trigger the LGATE signal 124. The LGATE signal 124 goes low ("0") at the beginning of a line and then goes high ("1") at the end of each line. These control signals indicate, among other things, when valid page information data is present on the IMAGEDATA signal 126. The FGATE signal 120 is used to control the detection system 118.

FIG. 7 shows a more detailed block diagram of the system and method for distinguishing between initial blank pages and subsequent blank pages within a reproduction job shown in FIG. 5. In this embodiment, the detection system 118 can be located within the printer interface (not shown) or the scanner interface 78. For clarity, the detection system 118 within the scanner interface 78 is shown. The CCD 32 (shown in FIG. 1) feeds the IMAGEDATA signal 126 into the scanner interface 78. Within the scanner interface 78, the IMAGEDATA signal 126 is fed to a controller 140. The controller 140 activates/deactivates the detection system 118 based on an OVERRIDE signal 141. The OVERRIDE signal 141 will be described below in more detail. If the detection system 118 is deactivated by the OVERRIDE signal 141, then the IMAGEDATA signal 126 does not pass through the detection system 118 at all. Thus, the controller 140 is a switch that can turn the detection system 118 on and off.

If the detection system 118 is active (i.e., a low OVERRIDE signal 141), then the IMAGEDATA signal 126 is fed into a black dot comparator 142 that is triggered by a DOTCLOCK signal 144. The DOTCLOCK signal 144 is a control signal in the reproduction machine that pulses for every dot in the IMAGEDATA signal 126. The comparators within the system, including the black dot comparator 142 are preferably hardware comparators, but may also be programmed microprocessors. The black dot comparator 142 compares each dot within the IMAGEDATA signal 126 to a black dot threshold signal contained within a black dot threshold memory 146. The black dot comparator 142 determines if a black dot is present. The black dot threshold signal, which is generated by the reproduction machine at start-up, varies depending on temperature of the scanning lamp and is stored in the black dot threshold memory 146.

If the black dot comparator 142 detects a black dot, then a black dot counter 148 is incremented. The black dot counter 148 accumulates the number of black dots on a particular page, generates a page signal when the FGATE signal 120 goes low (to indicate the end of a page), and resets itself so that the number of black dots on the next page can be counted. The output of the black dot counter 148 is fed into an information page comparator 150 that compares the page signal from the black dot counter to an information page threshold signal stored in an information page threshold memory 152. The information page comparator 150 is triggered by the FGATE signal 120 and deactivated momentarily by a NEWPAGE signal 154.

Generally, the NEWPAGE signal 154 will be high and keeps the information page comparator active. However, when a job having multiple sets is being reproduced and a page is being repeatedly scanned for the multiple sets, then the NEWPAGE signal 154 goes low to prevent the information page comparator 150 from comparing the same page to the information page threshold more than once. Thus, even for multiple sets where pages are rescanned for each set, the detection system 118 can correctly determine the number of actual blank pages within a reproduction job. For some reproduction machines that recirculate the entire document for multiple sets, a NEWPAGE signal 154 is not required. In addition, a NEWPAGE signal 154 is not required for a facsimile machine since a facsimile machine does not generate multiple sets of a document.

The information page threshold signal is generated by the reproduction machine at start-up and stored in an information page threshold memory 152. Any time the page signal from the black dot counter 148 exceeds the information page threshold signal (i.e., a non-blank page is detected), the OVERRIDE signal 141 is set to "1" so that the controller 140 will deactivate the detection system 118 until a new reproduction job is started. If the information page threshold is not exceeded (i.e., a blank page is detected), then a blank page signal is fed to a blank page counter 156. The blank page counter 156 is reset at the beginning of each new reproduction job by a JOBSTART signal 158. For each blank page detected by the information page comparator 150, the blank page counter 156 is incremented. The count signal of the blank page counter 156 is fed into a blank page comparator 160. A blank page threshold signal from a blank page threshold memory 162 is also fed into the blank page comparator 160. The blank page threshold memory 162 can either be set by a service person or is user adjustable.

Preferably the blank page threshold memory 162 is set at two pages, but can be adjusted. For example, if the blank page threshold memory value is set at two (2), then up to 2 blank pages are allowed to print before the reproduction job is stopped. The blank page comparator 160 determines whether the blank page counter signal exceeds the blank page threshold signal. If the blank page counter exceeds the blank page threshold, then the blank page comparator 160 sends a stop signal to the CPU 54 and stops the reproduction machine. On the other hand, if the blank page counter does not exceed the blank page threshold level, then no signal is sent to the CPU 54 and the reproduction machine continues to operate.

The controller 140, in operation, controls the detection system 118 and is able to distinguish between initial blank pages in a reproduction job and blank pages that occur later in a job that should not cause a job to be stopped. To distinguish between an initial blank page and a blank page in the middle of a copy job, the controller 140 uses the OVERRIDE signal 141. The OVERRIDE signal 141 goes low ("0") every time a new print job comes into the detection system 118. The information page comparator 150 generates a high OVERRIDE signal 141 whenever a non-blank page is detected. Once the OVERRIDE signal 141 has been activated, the controller 140 will prevent the detection system 118 from detecting any further blank pages until a new reproduction job is started. Thus, the detection system 118 is activated at the beginning of every print job and then is turned off by the controller 140 once an image page is scanned. In summary, a reproduction job is only stopped if the OVERRIDE signal 141 is low and the blank page counter exceeds the blank page threshold. This system allows the reproduction machine to distinguish between initial blank copy pages and blank pages within a reproduction job which will not stop the reproduction job. Thus, initial blank pages, which usually indicate that a job has been placed in an automatic document feeder in an incorrect fashion are distinguished from a blank page which may be contained within the middle of a reproduction job. The blank page in the middle of a reproduction job can be a separator page or it can be placed there in order to correctly reproduce a job, such as a book, that has both single sided and double sided pages.

Figure 8:
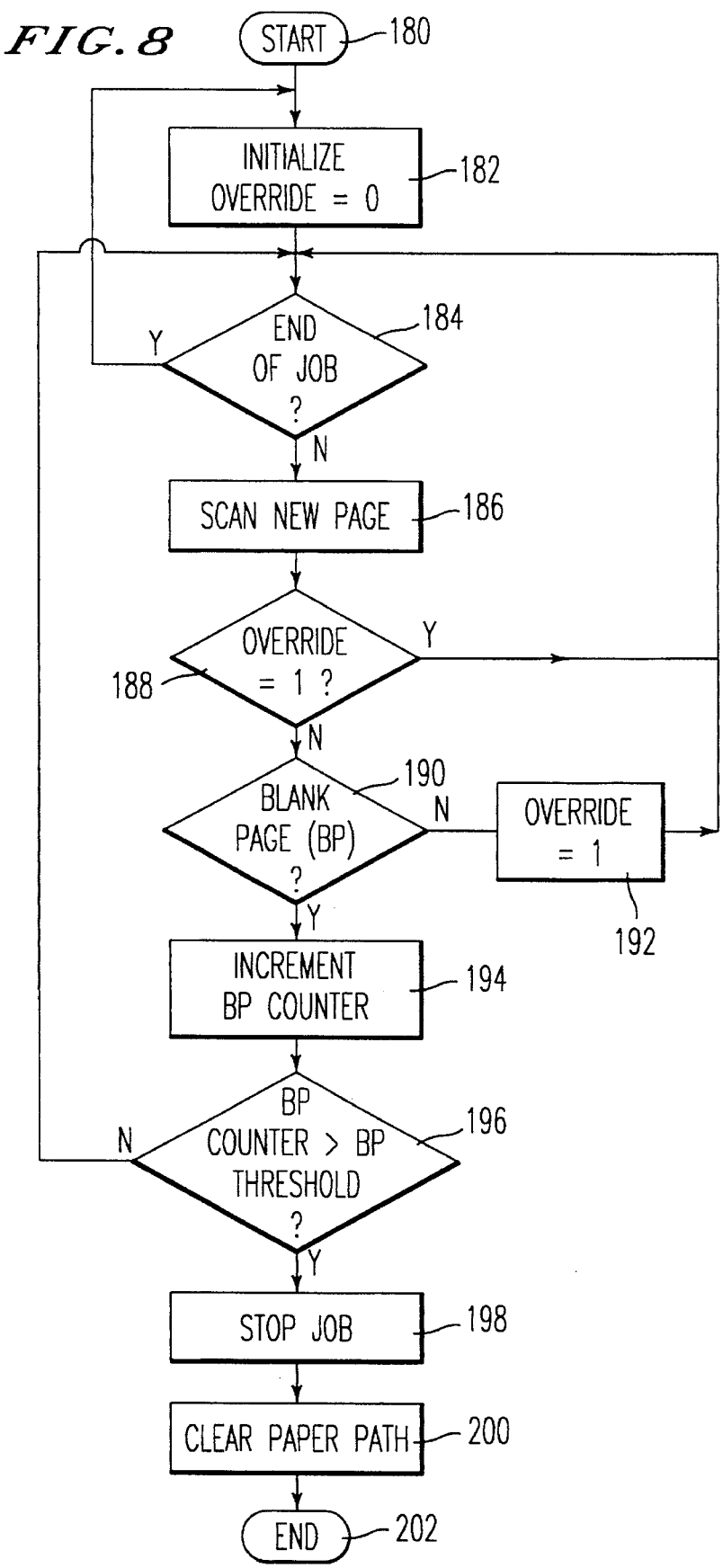
FIG. 8 is a flowchart showing the operation of the embodiment of FIG. 7.

FIG. 8 shows a flowchart depicting the steps carried out by the system of FIG. 7. In step 180 the method is started. In step 182, the system is initialized (i.e., the OVERRIDE signal is reset and the blank page counter is set back to zero). In step 184 it is determined whether or not the end of the job has been reached. If the end of the job has been reached, then the system loops back to step 182. If the end of the job has not been reached, then step 186 is executed, in which a new page is scanned into the scanning interface 78 and possibly printed. After the page has been scanned in step 186, it is determined whether or not the OVERRIDE signal is active in step 188. If the OVERRIDE signal is active, then the system loops back to step 184. It the OVERRIDE signal is not active, then the scanned page data coming in from the scanner is analyzed and is compared to the information page threshold in step 190 to determine if a blank page is detected. If the scanned page exceeds the information page threshold (i.e., an non-blank information page is detected), then the OVERRIDE signal is activated in step 192 and control goes back to step 184. If the scanned page does not exceed the information page threshold (i.e., a blank page is detected), then control continues to step 194 in which the blank page counter is incremented by one. Next, in step 196, it is determined whether or not the blank page counter exceeds the blank page threshold. If the blank page counter does not exceed the blank page threshold then control is returned to step 184. On the other hand, if the blank page counter exceeds the blank page threshold, which may indicate that the reproduction job is upside down in the automatic document feeder, then the job is stopped in step 198. Then in step 200 the paper path is cleared. Finally, the method ends in step 202. As can be seen, both the OVERRIDE signal must be inactive and the blank page counter must exceed the blank page threshold in order to stop the job and clear the paper path. This feature allows a system and method of the present invention to distinguish between initial blank pages within a reproduction job and blank pages later in a job that should not stop a reproduction job.

Figure 9:
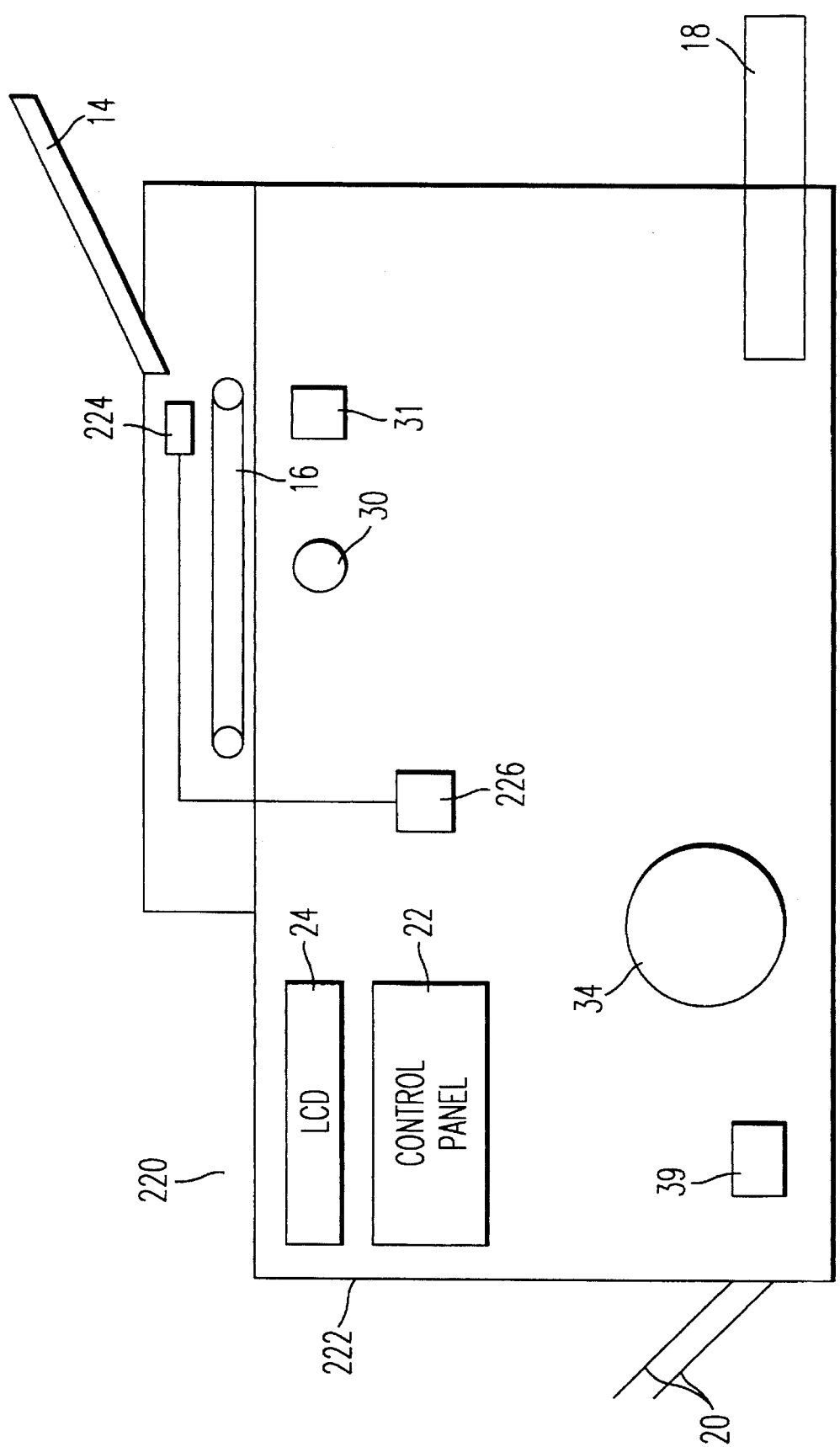
FIG. 9 is a schematic view of another embodiment of the present invention wherein a detector is placed within the automatic document feeder of an analog reproduction machine to generate the signals for distinguishing and detecting blank pages within a reproduction job.

FIG. 9 is a schematic diagram of an analog copier that can use the present system and method of the present invention in order to distinguish between initial blank pages in a reproduction job and blank pages in subsequent parts of the reproduction job. An analog copier 220 is shown, including a housing 222. Many of the components of the analog copier are identical to the reproduction machine 10 shown in FIG. 1. Thus, like reference numerals will be applied to like parts. For example, the same document feeder 14, automatic document transport 16, paper tray 18, output trays 20, control panel 22, LCD 24 and fuser 39 are used. In addition, the light source 30 and the mirror assembly 31 are used to image the document being fed into the analog copier. In an analog copier 220 however, the image of the page is imaged directly onto the photoreceptor 34. In this way, an image from a paper on an analog copier is never converted into an electrical signal representing the optical characteristics of a page. For this reason, in order to use the system and method of the present invention to its fullest extent an image signal must be generated somewhere. In order to do this, a sensor 224 is provided. The sensor is preferably a contact type sensor that generates an image of the original document as the document is fed past it. The output of the sensor 224 is fed into the detection system 226 which functions identically to the other detection systems disclosed in the previous embodiments. In this way, the system and method of the present invention to distinguish between initial blank pages and subsequent blank pages can be incorporated into an analog copier 220 without undue change to the system.

The system and method of the present invention can also be used in conjunction with a conventional facsimile machine to detect and distinguish between initial blank pages and blank pages within the facsimile job. The page analysis system and method for a facsimile machine uses the previously described hardware as well as the previously described steps. Thus, no discussion of the hardware and steps will be presented here.

While the invention has been described using the OVERRIDE signal, the OVERRIDE signal may be implemented as a register or a variable in a computer memory. For example, instead of having a dedicated line to carry the OVERRIDE signal, the invention may be practiced using a microprocessor, memory, and other circuitry which examines the memory location to determine if there is a beginning of a job or whether pages of the job with information thereon have already been processed. In this case, after pages having information have been detected, the memory location having the information of the beginning of the job will be altered to indicate that the job is past the beginning.

This invention may also be conveniently implemented using a conventional general purpose digital computer programmed according to the teachings of the present specification, as will be apparent to those skilled in the computer art. Appropriate software coding can readily be prepared by skilled programmers based on the teachings of the present disclosure as will be apparent to those skilled in the software art.

The invention may also be implemented by the preparation of applications specific integrated circuits or by interconnecting an appropriate network of conventional component circuits, as will be readily apparent to those skilled in the art.

The present invention includes a computer program product which is a storage medium including instructions that can be used to program a computer to perform the process of the present invention. The storage medium can include, but is not limited to, any type of disc including floppy discs, optical discs, CD-ROMs, magneto-optical discs, ROMs, RAMs, EPROMs, EEPROMs, magnetic or optical cards, or any type of media that is suitable for storing electronic instructions.

While the invention has been described with reference to specific preferred embodiments, it will be understood by those skilled in the art that various changes may be made and equivalents may be substituted for elements without departing from the true spirit and scope of the invention.

I claim:

1. A method for analyzing pages, comprising the steps of:
   determining a beginning of a job;
   obtaining page information included in the job;
   determining if a page represented by the page information is a blank page;
   determining if the job is past the beginning when the page is determined not to be a blank page;
   incrementing a blank page counter when the page is determined to be a blank page;
   comparing the blank page counter to a blank page threshold; and
   indicating an error has occurred when the comparing step determines that the blank page counter has exceeded the blank page threshold and the job is not past the beginning.

2. A method according to claim 1, further comprising the step of:
   stopping an automatic document feeder when the comparing step determines that the blank page counter has exceeded the blank page threshold.

3. A method according to claim 1, further comprising the step of:
   stopping a printer when the comparing step determines that the blank page counter has exceeded the blank page threshold.

4. A method according to claim 1, wherein the step of obtaining page information includes:
   obtaining the page information from a computer.

5. A method according to claim 1, wherein the step of obtaining page information includes:
   obtaining the page information by scanning the page.

6. A method according to claim 1, further comprising the step of:
   inputting, by a user, the blank page threshold.

7. A system for analyzing pages, comprising:
   means for determining a beginning of a job;
   means for obtaining page information included in the job;
   means for determining if a page represented by the page information is a blank page or an information page;
   means for generating an override signal if an information page is detected;
   means for incrementing a blank page counter if the page is determined to be a blank page;
   means for comparing the blank page counter to a blank page threshold; and
   means for indicating an error has occurred when a blank page is detected and no override signal has been generated.

8. A system according to claim 7, further comprising:
   means for stopping an automatic document feeder when the comparing means determines that the blank page counter has exceeded the blank page threshold.

9. A system according to claim 7, further comprising:
   means for stopping a printer when the comparing means determines that the blank page counter has exceeded the blank page threshold.

10. A system according to claim 7, wherein the means for obtaining page information includes:
    means for obtaining the page information from a computer.

11. A system according to claim 7, wherein the means for obtaining page information includes:
    means for obtaining the page information by scanning the page.

12. A system according to claim 7, further comprising:
    means for inputting, by a user, the blank page threshold.

13. A system for analyzing pages, comprising:
    means for determining a beginning of a job;
    means for obtaining page information included in a job;
    means for determining if a page represented by the page information is a blank page;
    means for generating an override signal if an information page is detected; and
    means for indicating an error has occurred when a blank page is detected and no override signal has been generated.

14. A printing system, comprising:

an information input which receives page information of a print job;

means for determining if the page information includes a plurality of consecutive blank pages at a beginning of the print job;

a printer which prints the page information; and a controller which stops the printer from printing the page information when the means for determining determines that the page information includes a plurality of consecutive blank pages at the beginning of the print job and operates without stopping the printer when the plurality of blank pages exist after the beginning of the print job.

15. A system according to claim 14, further comprising:

a scanner, connected to the information input, which produces the page information.

16. A system according to claim 14, further comprising:

a computer, connected to the information input, which produces the page information.

17. A system according to claim 14, wherein the means for determining comprises:

means for determining the beginning of the print job;

means for determining if a page represented by the page information is a blank page;

means for determining the print job is past the beginning when the page is determined not to be a blank page;

means for incrementing a blank page counter when the page is determined to be a blank page;

means for comparing the blank page counter to a blank page threshold; and means for indicating an error has occurred when the comparing means determines that the blank page counter has exceeded the blank page threshold and the print job is not past the beginning.

18. A system according to claim 14, wherein the printer comprises:

a laser;

a polygonal mirror; and a photoreceptor which receives light from the laser reflected off of the polygonal mirror.

19. A facsimile machine, comprising:

a scanner which generates page information from a scanning job;

means for determining if the page information includes a plurality of consecutive blank pages at a beginning of the scanning job;

a transmitter which transmits the page information; and a controller which stops the transmitter from transmitting the page information when the means for determining determines that the page information includes a plurality of consecutive blank pages at the beginning of the scanning job and operates without stopping the transmitter when the plurality of blank pages exist after the beginning of the scanning job.

20. A system according to claim 19, wherein the means for determining comprises:

means for determining the beginning of the scanning job;

means for determining if a page represented by the page information is a blank page;

means for determining the scanning job is past the beginning when the page is determined not to be a blank page;

means for incrementing a blank page counter when the page is determined to be a blank page;

means for comparing the blank page counter to a blank page threshold; and means for indicating an error has occurred when the comparing means determines that the blank page counter has exceeded the blank page threshold and the scanning job is not past the beginning.

21. A computer program product having a computer readable medium having computer program logic recorded thereon for determining if page information of a job includes a plurality of consecutive blank pages at a beginning of the job, comprising:

means for determining the beginning of the job;

means for determining if a page represented by the page information is a blank page;

means for determining the job is past the beginning when the page is determined not to be a blank page;

means for incrementing a blank page counter if the page is determined to be a blank page;

means for comparing the blank page counter to a blank page threshold; and means for determining a plurality of consecutive blank pages exist when means for comparing determines that the blank page counter has exceeded the blank page threshold and when the job is not past the beginning.

* * * * *